United States Patent
Jun et al.

(10) Patent No.: US 10,434,931 B2
(45) Date of Patent: Oct. 8, 2019

(54) LIGHT DISTRIBUTION SWITCHING DEVICE OF HEAD LAMP

(71) Applicant: HYUNDAI MOBIS CO., LTD., Seoul (KR)

(72) Inventors: Young Geun Jun, Seoul (KR); Hyuk Min Lee, Seongnam-si (KR); Gil Won Han, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/801,678

(22) Filed: Nov. 2, 2017

(65) Prior Publication Data

US 2018/0345849 A1    Dec. 6, 2018

(30) Foreign Application Priority Data

May 31, 2017    (KR) .................. 10-2017-0067516

(51) Int. Cl.
*F21V 17/02* (2006.01)
*B60Q 1/14* (2006.01)
(Continued)

(52) U.S. Cl.
CPC ............ *B60Q 1/1438* (2013.01); *F21S 41/47* (2018.01); *F21S 41/692* (2018.01); *F21S 41/698* (2018.01); *B60Y 2306/09* (2013.01)

(58) Field of Classification Search
CPC . B60Q 1/04; B60Q 1/143; B60Q 1/24; B60Q 2300/056; B60Q 2300/42; B60Q 1/0433; B60Q 1/0483; B60Q 1/1438; B60Q 1/18; B60Q 1/2611; B60Q 2300/122; B60Q 2300/124; B60Q 2300/40; B60Q 3/30; B60Q 3/44; F21S 41/698; F21S 41/695; F21S 48/1159; F21S 48/1794; F21S 48/125; F21S 48/1258; F21S 41/255; F21S 41/147; F21S 41/321; F21S 41/47; F21S 41/689; F21S 45/47; F21S 41/36; F21S 41/365;
(Continued)

(56) References Cited

U.S. PATENT DOCUMENTS

2015/0316225 A1*  11/2015  Yamamoto ............ F21S 41/698
                                                    362/282
2016/0102830 A1*   4/2016  Shin ....................... B60Q 1/04
                                                    362/513

FOREIGN PATENT DOCUMENTS

KR    10-2011-0120715 A    11/2011
KR    10-2016-0012326 A     2/2016
KR       10-1717692 B1      3/2017

OTHER PUBLICATIONS

Office Action of corresponding Korean Patent Application No. 10-2017-0067516—7 pages (dated Jun. 14, 2018).

* cited by examiner

*Primary Examiner* — Thien T Mai
(74) *Attorney, Agent, or Firm* — Knobbe Martens Olson & Bear LLP

(57) ABSTRACT

A light distribution switching device of a head lamp may include: a housing installed at the front of a light source of the head lamp; a shield part rotatably installed in the housing, and adjusting movement of light irradiated from the light source depending on a rotational position; a rotating gear mounted on the shield part and rotated with the shield part; a driving part rotating a driving gear engaged with the rotating gear; and an elastic return part installed on the shield part, and moving the shield part to the original position when the driving part is stopped.

6 Claims, 12 Drawing Sheets

(51) Int. Cl.
*F21S 41/692* (2018.01)
*F21S 41/47* (2018.01)
*F21S 41/698* (2018.01)

(58) Field of Classification Search
CPC ........ F21S 41/37; F21S 41/635; F21S 41/675;
F21S 41/683; F21S 41/155; F21S 41/162;
F21S 41/172; F21S 41/275; F21S 41/28;
F21S 41/43; F21S 41/692; F21S 48/142;
F21S 48/1784; F21S 48/1789; F21S 4/20;
F21S 4/28
See application file for complete search history.

LIGHT DISTRIBUTION SWITCHING DEVICE OF HEAD LAMP

CROSS-REFERENCES TO RELATED APPLICATIONS

The present application claims priority to Korean application number 10-2017-0067516, filed on May 31, 2017, which is incorporated by reference in its entirety.

BACKGROUND OF THE INVENTION

The present invention relates to a light distribution switching device of a head lamp, and more particularly, to a light distribution switching device of a head lamp, which has an integrated shield structure capable of reducing the size of a product.

In general, a vehicle uses a lighting system to illuminate objects in the driving direction during night driving, or uses a lighting system to inform other vehicles or other road users of a driving state of the vehicle.

Among lighting systems for a vehicle, a head lamp which is also referred to as a headlight is mounted at both side fronts of a vehicle and illuminates the front road of the vehicle during night driving. Thus, the head lamp can secure the visibility of a driver in the driving direction. The head lamp requires brightness that allows the driver to check an obstacle at a predetermined distance on the front road. Furthermore, the light of the head lamp needs to be scattered to some extent in order to help the driver to check the surrounding conditions.

Simultaneously, the head lamp must not disturb other drivers coming in the opposite direction. For example, the head lamp may dazzle other drivers. In this case, the driver may switch the head lamp to a low beam or high beam mode.

In order to switch between the low-beam mode and the high-beam mode, the conventional head lamp includes a low beam which is turned on in the night time at normal times and a high beam which is used only on a lonely road where there are no night lightings or other vehicles.

However, when the high beam and the low beam are individually installed, components for the high beam and the low beam must be separately installed. Therefore, the conventional head lamp requires more parts and installation spaces.

In order to overcome such a problem, a light distribution switching device including a rotating shield has been developed. The light distribution switching device can selectively irradiate light of a high beam and light of a low beam using one light source. The light distribution switching device may rotate the shield using an actuator, and switch the mode of light irradiated from the head lamp to the low-beam mode or the high-beam mode.

Since the conventional light distribution switching device requires the complex structure to fix the shield and the actuator, the size of the device and the number of parts used in the device are inevitably increased to raise the manufacturing cost. Therefore, there is a demand for a device capable of solving the problem.

SUMMARY OF THE INVENTION

Embodiments of the present invention are directed to a light distribution switching device of a head lamp, which has an integrated shield structure capable of reducing the size of a product.

In one embodiment, a light distribution switching device of a head lamp may include: a housing installed at the front of a light source of the head lamp; a shield part rotatably installed in the housing, and adjusting movement of light irradiated from the light source depending on a rotational position; a rotating gear mounted on the shield part and rotated with the shield part; a driving part rotating a driving gear engaged with the rotating gear; and an elastic return part installed on the shield part, and moving the shield part to the original position when the driving part is stopped.

The light distribution switching device may further include a holder part forced into a connection hole through the housing, the connection hole being formed at a side surface of the shield part.

The holder part may include: a head member locked to the outside of the housing; an extended body extended from the head member, and forced into the connection hole; and a deformable protrusion protruding to the outside of the extending member, and deformed by the operation of forcing the extended body into the connection hole.

The deformable protrusion may include a plurality of deformable protrusions formed along the outer circumference of the extended body, and having an inclined surface formed at one side thereof.

The housing may include: a first body part having a first mounting groove to which both sides of the driving part are inserted and coupled; and a first support part extended from the first body part and rotatably supporting the shield part. The holder part may be forced into the connection hole through the first support part.

The light distribution switching device may further include an elastic damper member installed on the first body part located on a moving path of the shield part, and protruding to the outside of the first body part.

The shield part may include: a shield body having the connection hole formed at one side facing the first support part; and a rotation support protrusion protruding to the other side of the shield body, and inserted into the first support part.

The shield part may further include a shield panel integrated with the shield body so as to rotate with the shield body, and adjusting an irradiation region of light irradiated from the light source.

The housing may include: a second body part having a second mounting groove to which both sides of the driving part are inserted and coupled; and a second support part which is extended from the second body part and to which the shield part is inserted and coupled so as to be rotatably supported.

The shield part may include: a shield shaft member having both sides rotatably inserted into the second support part; a shield body extended from the shield shaft member, and coupled to the rotating gear; and a shield panel extended from the shield shaft member, rotated with the shield shaft member, and adjusting the amount of light irradiated from the light source.

The rotating gear may be fixed to the shield body, and have a gear engaged with the driving gear, the gear being formed only on the outer circumference of the rotating gear in a preset angle range.

The elastic return part may include a coil spring, and be installed outside the shield shaft member.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
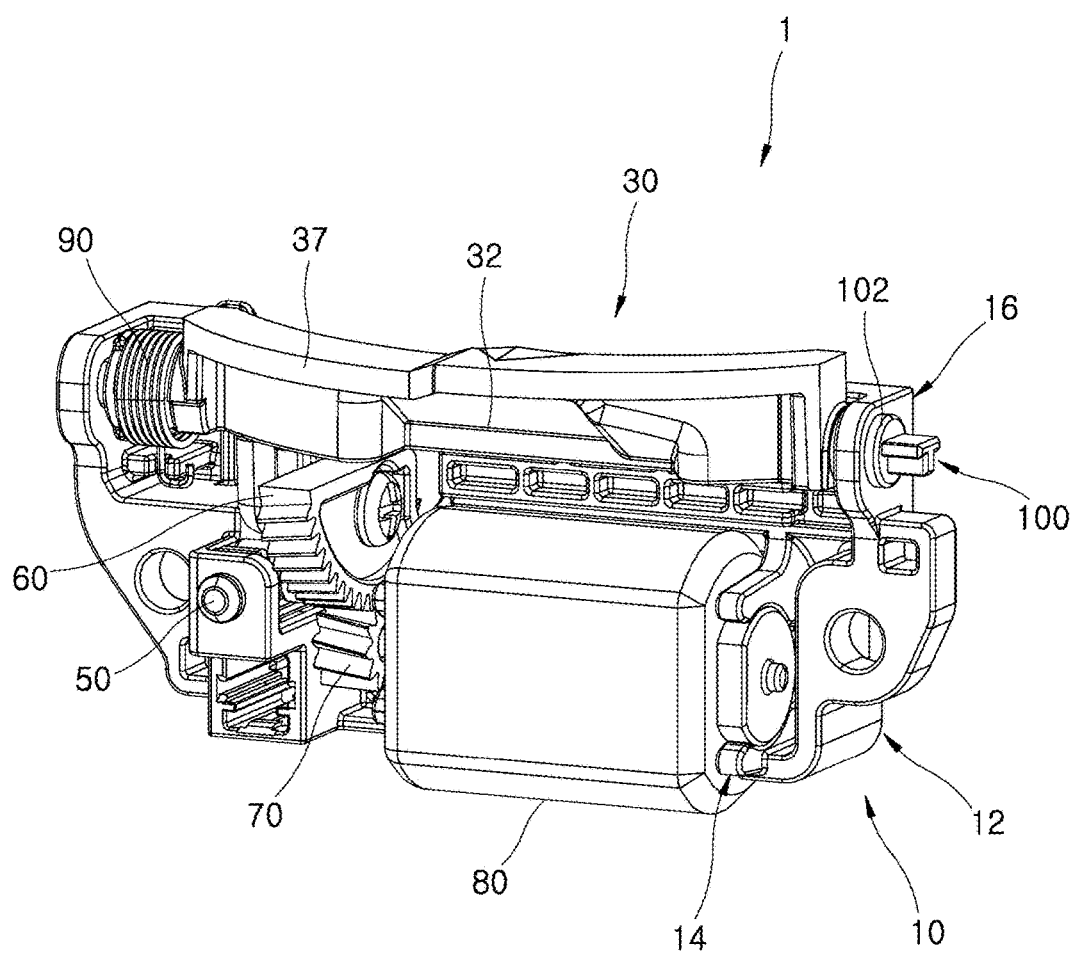
FIG. 1 is a schematic perspective view illustrating the structure of a light distribution switching device in accordance with an embodiment of the present invention.
Figure 2:
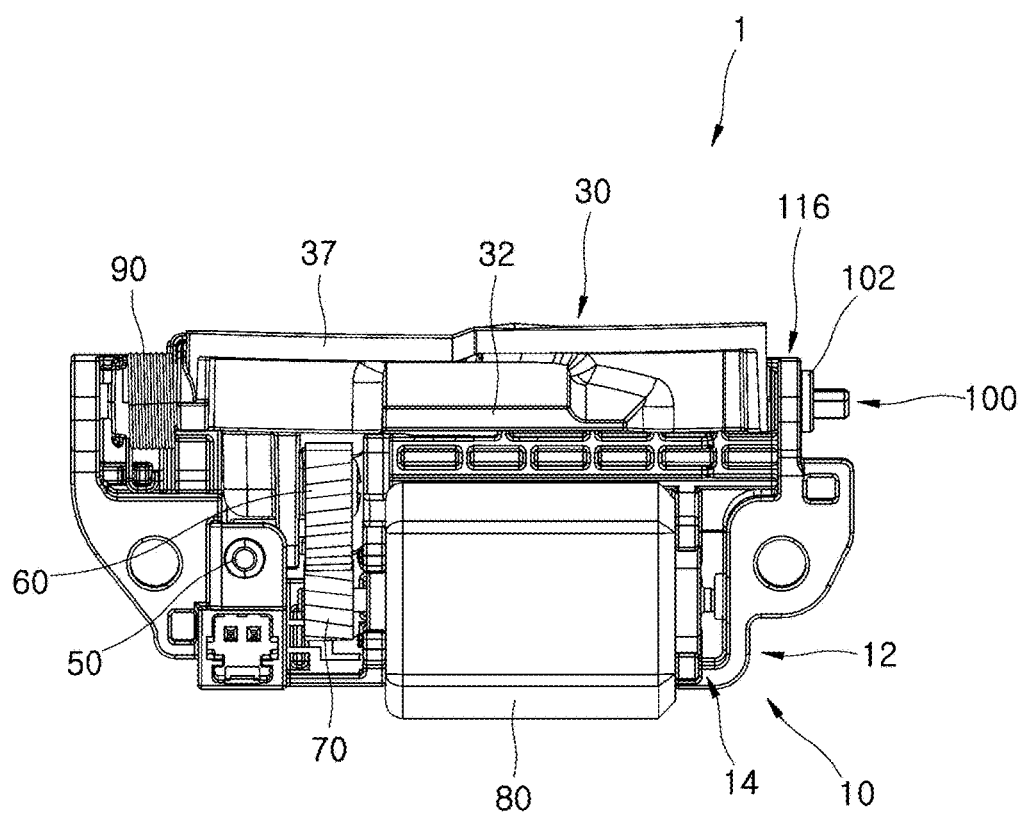
FIG. 2 is a front view of the light distribution switching device of the head lamp in accordance with the embodiment of the present invention.
Figure 3:
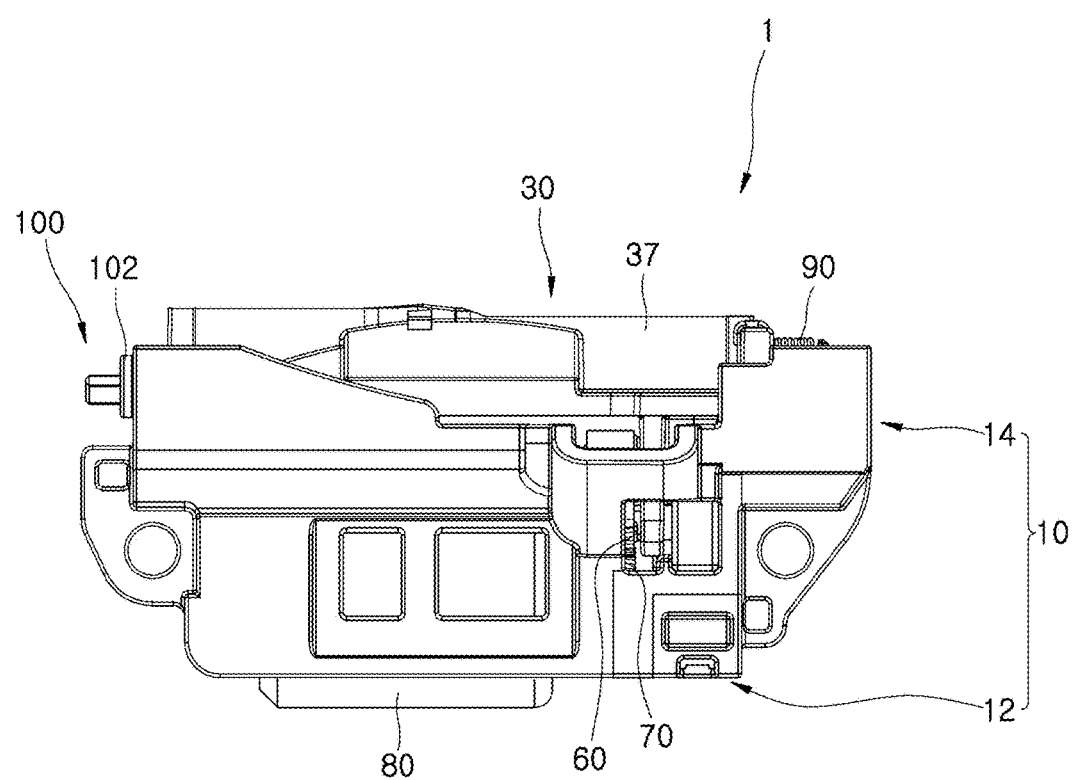
FIG. 3 is a rear view of the light distribution switching device of the head lamp in accordance with the embodiment of the present invention.
Figure 4:
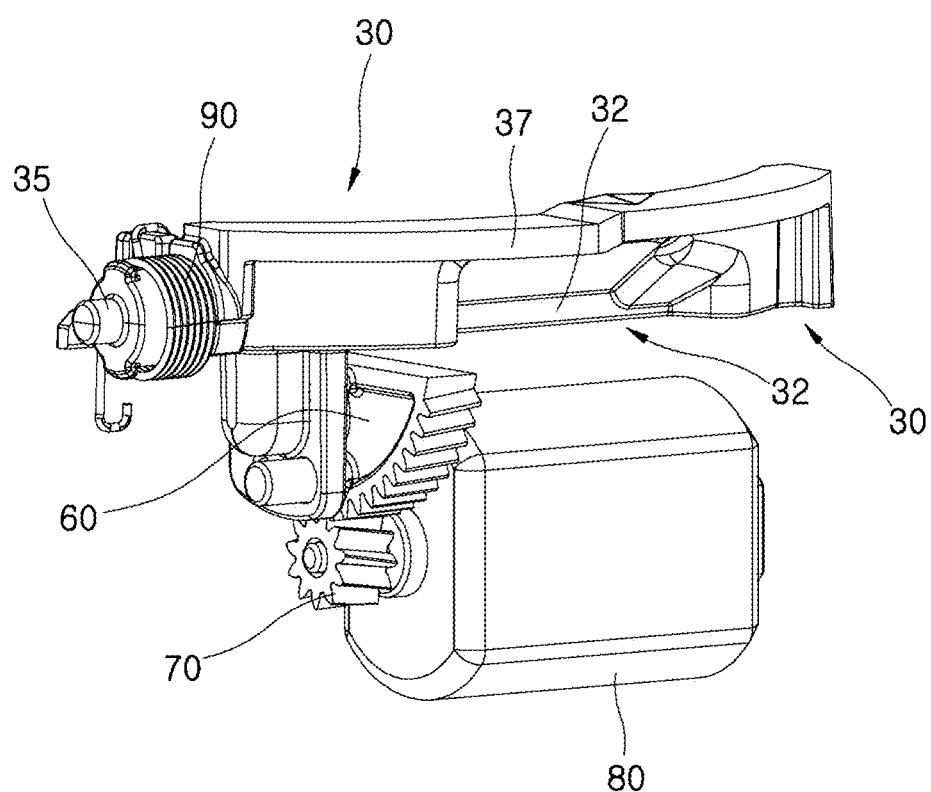
FIGS. 4 and 5 are perspective views illustrating a shield part, a rotating gear, a driving gear and a driving part in accordance with the embodiment of the present invention.
Figure 5:
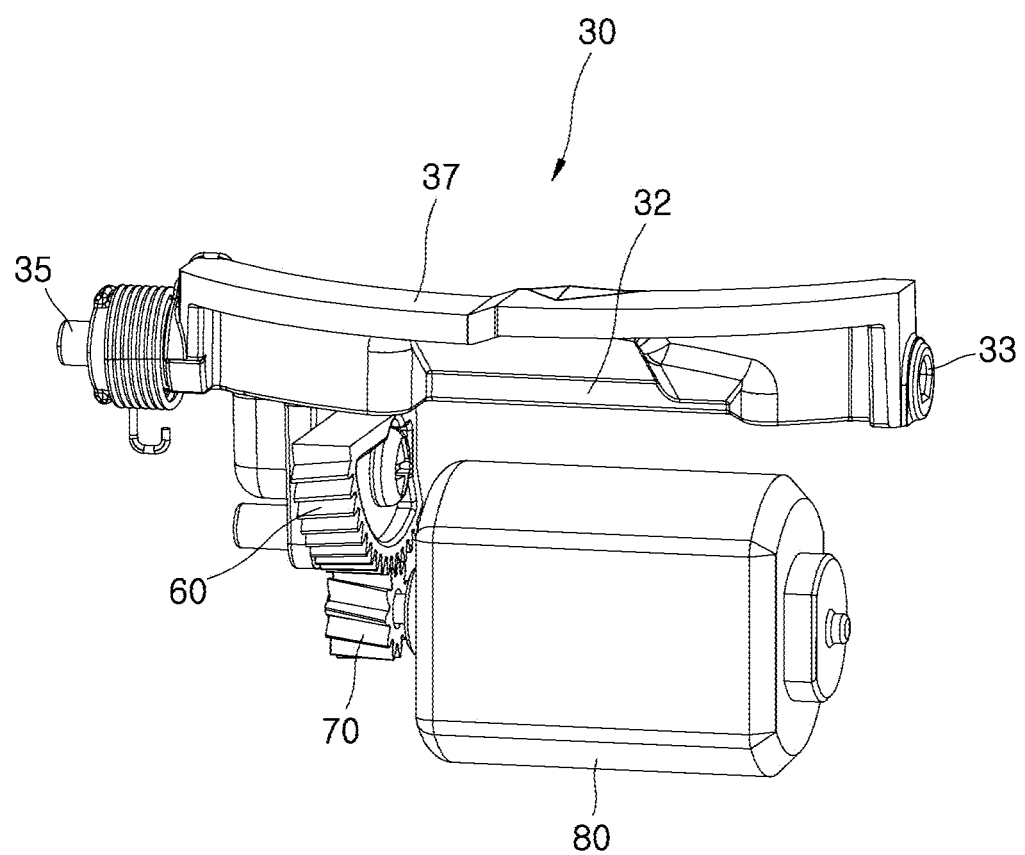
Figure 6:
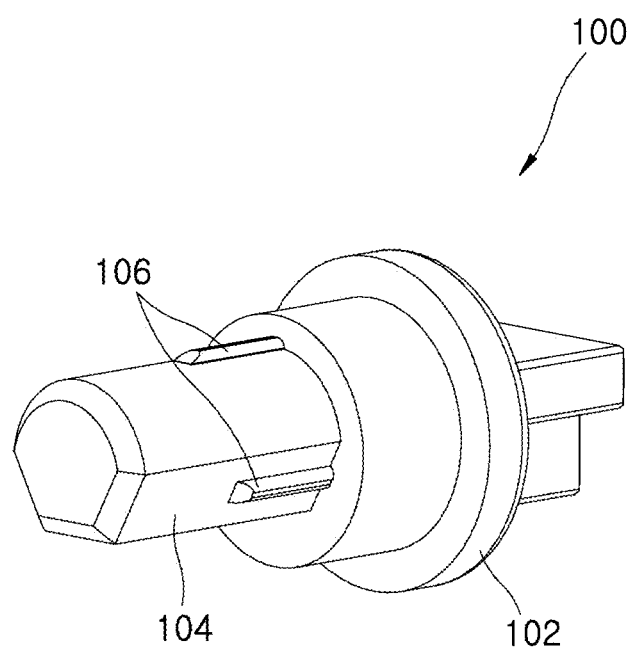
FIG. 6 is a perspective view of a holder part in accordance with the embodiment of the present invention.

FIG. 1 is a schematic perspective view illustrating the structure of a light distribution switching device in accordance with an embodiment of the present invention, FIG. 2 is a front view of the light distribution switching device of the head lamp in accordance with the embodiment of the present invention, FIG. 3 is a rear view of the light distribution switching device of the head lamp in accordance with the embodiment of the present invention, FIGS. 4 and 5 are perspective views illustrating a shield part, a rotating gear, a driving gear and a driving part in accordance with the embodiment of the present invention, and FIG. 6 is a perspective view of a holder part in accordance with the embodiment of the present invention.

As illustrated in FIGS. 1 to 3, the light distribution switching device 1 of the head lamp in accordance with the embodiment of the present invention may include a housing 10, a shield part 30, a rotating gear 60, a driving part 80 and an elastic return part 90. The housing 10 may be installed at the front of a light source of the head lamp, the shield part 30 may be rotatably installed in the housing 10 and adjust movement of light irradiated from the light source depending on a rotational position, the rotating gear 60 may be mounted on the shield part 30 and rotated with the shield part 30, the driving part 80 may rotate the driving gear 70 engaged with the rotating gear 60, and the elastic return part 90 may be installed on the shield part 30 and move the shield part 30 to the original location when the driving part 80 is stopped.

The housing 10 may be installed at the front of the light source of the head lamp. Specifically, the housing 10 may be installed at the front bottom of the light source, and both sides of the shield part 30 may be rotatably connected to the housing 10. The housing 10 may include a first body part 12 and a first support part 16.

The driving part 80 using a motor may be installed in the first body part 12 forming the lower part of the housing 10 (hereafter, based on FIG. 1). The first body part 12 may have a first mounting groove 14 formed at the front thereof, and both sides of the driving part 80 may be inserted and coupled to the first mounting groove 14. The driving part 80 using a motor may have protrusions formed at both sides thereof, and the protrusions formed at both sides of the driving part 80 may be inserted and fixed to the first mounting groove 14. Therefore, since the driving part 80 is easily installed and removed, the productivity can be improved while the maintenance cost can be reduced.

The first support part 16 may be extended upward from the first body part 12, and rotatably support the shield part 30. The light distribution switching device 1 of the head lamp may include a holder part 100 which is forced into a connection hole 33 through the first support part 16. Therefore, an operation of installing the shield part 30 in the housing 10 can be conveniently performed.

As illustrated in FIGS. 1, 4 and 5, the shield part 30 may be rotatably installed in the housing 10, and adjust movement of light irradiated from the light source depending on a rotational position. The shield part 30 in accordance with the present embodiment may include a shield body 32, a rotation support protrusion 35 and a shield panel 37.

The shield body 32 may have the connection hole 33 formed at one side facing the first support part 16 (right side in FIG. 1), and extend in the horizontal direction. The connection hole 33 may include a lower portion forming a polygonal groove and an upper portion forming a circular groove. Therefore, the holder part 100 may be inserted into the connection hole 33 while having directivity, and then fixed to the connection hole 33. A part of the shield body 32 may be extended to the bottom facing the rotating gear 60, and fixed to the rotating gear 60.

The rotation support protrusion 35 may protrude from the other side of the shield body 32 so as to be inserted into the first support part 16. The rotation support protrusion 35 and the shield body 32 may be formed as one body.

Since the shield panel 37 is also integrated with the shield body 32, the shield panel 37 may be rotated with the shield body 32. The shield panel 37 may be formed in various shapes as long as the shield panel 37 can adjust an irradiation region of light irradiated from the light source through a rotating operation. When a single light source is used to implement light irradiation of high and low beams, the light transfer path may be controlled by the rotation of the shield panel 37, in order to adjust the light irradiation of the high and low beams. Since the technique for adjusting an irradiation region of light through rotation of the shield part 30 is obvious to those skilled in the art, the detailed descriptions thereof are omitted herein.

The elastic return part 90 may be installed on the shield part 30, and include various types of elastic elements as long as they can move the shield part 30 to the original position when the driving part 80 is stopped. The elastic return part 90 in accordance with the present embodiment may include a coil spring. The elastic return part 90 to move the shield part 30 to the original position when the operation of the driving part 80 is stopped may not be installed in the housing 10, but directly installed on the shield part 30. Therefore, since the elastic return part 90 is coupled to the shield part 30 so as to form a module, the assembling operation may be more easily performed.

Since the rotation support protrusion 35 formed on the shield part 30 is not separately formed but injection-molded with the shield body 32, the time required for the assembling operation can be reduced.

Furthermore, the housing 10 may be formed as a single member, and the holder part 100 may be fixed to the shield part 30 through the housing 10 and rotatably support the shield part 30. Such a structure can suppress a reduction in operability of the shield part 30, and prevent beam flickering. In other words, since the number of parts used for assembling the shield part 30 and the housing 10 is reduced, an operability reduction caused by contraction of an injection-molded part can be suppressed. Furthermore, since the rotating operation of the shield part 30 is stably performed, beam flickering can be prevented.

A damper member 50 with elasticity may be installed at the housing 10 positioned on the moving path of the shield part 30. The damper member 50 in accordance with the present embodiment may be installed on the first body part 12. Since the elastic damper member 50 made of rubber or silicone protrudes to the outside of the first body part 12, the damper member 50 may reduce noise generated while the rotatably installed shield part 30 comes in contact with the housing 10. That is, while the shield part 30 comes in contact with the damper member 50 before coming in contact with the housing 10, the movement velocity and shock can be reduced. Thus, the noise generation can be prevented or reduced.

The rotating gear 60 may be mounted on the shield part 30 and rotated with the shield part 30. The rotating gear 60 in accordance with the present embodiment may be formed in a fan shape, and have a gear formed on the outer circumferential surface thereof in consideration of an angle at which the shield part 30 is rotated. Since the rotating gear 60 is fixed to the shield body 32, the rotating gear 60 may be rotated with the shield body 32.

The driving gear 70 engaged with the rotating gear 60 may be connected to an output shaft of the driving part 80. The driving part 80 in accordance with the present embodiment may use a motor, and be mounted in the housing 10.

As illustrated in FIGS. 1, 5 and 6, the holder part 100 may be forced into the connection hole 33 formed at a side surface of the shield part 30 through the housing 10. Thus, the holder part 100 may rotatably support the shield part 30. The holder part 100 in accordance with the present embodiment may include a head member 102, an extended body 104 and a deformable protrusion 106.

The holder part 100 may be injection-molded of plastic. If necessary, a stiffener such as glass fiber may be added to perform injection molding.

Since the head member 102 has a larger outer diameter than the connection hole 33, the head member 102 may be locked to the outside of the housing 10. The extended body 104 may be extended from the head member 102 and forced into the connection hole 33. The extended body 104 may have a cross-sectional surface corresponding to the connection hole 33. The extended body 104 in accordance with the present embodiment may include an upper portion with a polygonal cross-section and a lower portion with a circular cross-section. Therefore, the extended body 104 may be inserted into the connection hole 33 of the shield body 32 while having directivity.

The extended body 104 in accordance with the present embodiment may have two different diameters to form a multi-stage structure. The extended body 104 having a small diameter may be inserted into the connection hole 33, and the extended body 104 having a large diameter may be rotatably installed on the second support part 26 of the housing 10.

Since the deformable protrusion 106 protrudes to the outside of the extended body 104 and is deformed by an operation of forcing the deformable protrusion 106 into the connection hole 33, the deformable protrusion 106 may prevent the extended body 104 from escaping from the connection hole 33. The deformable protrusion 106 in accordance with the present embodiment may protrude in the longitudinal direction of the extended body 104. The extended body 104 may have a plurality of deformable protrusions 106 formed on the outer circumference thereof, and each of the deformable protrusions 106 may have an inclined surface formed at one side of thereof. Therefore, the deformable protrusions 106 can be easily moved into the connection hole 33.

Since the holder part 100 is injection-molded of plastic and the deformable protrusion 106 has a larger outer diameter of the connection hole 33, the deformable protrusion 106 may be deformed while being inserted into the connection hole 33. Therefore, the contact area between the holder part 100 and the connection hole 33 may be increased. Thus, since the coupling force of the holder part 100 is also increased, the operation of the shield part 30 rotated about the holder part 100 may be stably performed.

Hereafter, an assembling process of the light distribution switching device 1 of the head lamp in accordance with the embodiment of the present invention will be described in detail with reference to the accompanying drawings.

The damper member 50 for reducing noise and shock may be installed in the housing 10. Then, the rotating gear 60 and the elastic return part 90 may be installed on the shield part 30 to form one module, and the module may be installed at a mounting position of the housing 10.

The connection hole 33 of the shield part 30 may be matched with the hole formed in the first support part 16 of the housing 10, and the holder part 100 may be inserted into the connection hole 33 of the shield part 30 through the first support part 16. In order to prevent a separation of the holder part 100 from the connection hole 33, the holder part 100 may be forced into the connection hole 33. Furthermore, since the deformable protrusions 106 are deformed while being inserted into the connection hole 33 with the extended body 104, the coupling force may be improved to prevent a separation of the holder part 100.

Hereafter, a light distribution switching device 5 of a head lamp in accordance with another embodiment of the present invention will be described with reference to the drawings.

For convenience of description, components which are configured and operated in the same manner as those of the above-described embodiment are represented by like reference numerals, and the detailed descriptions thereof are omitted herein.

Figure 7:
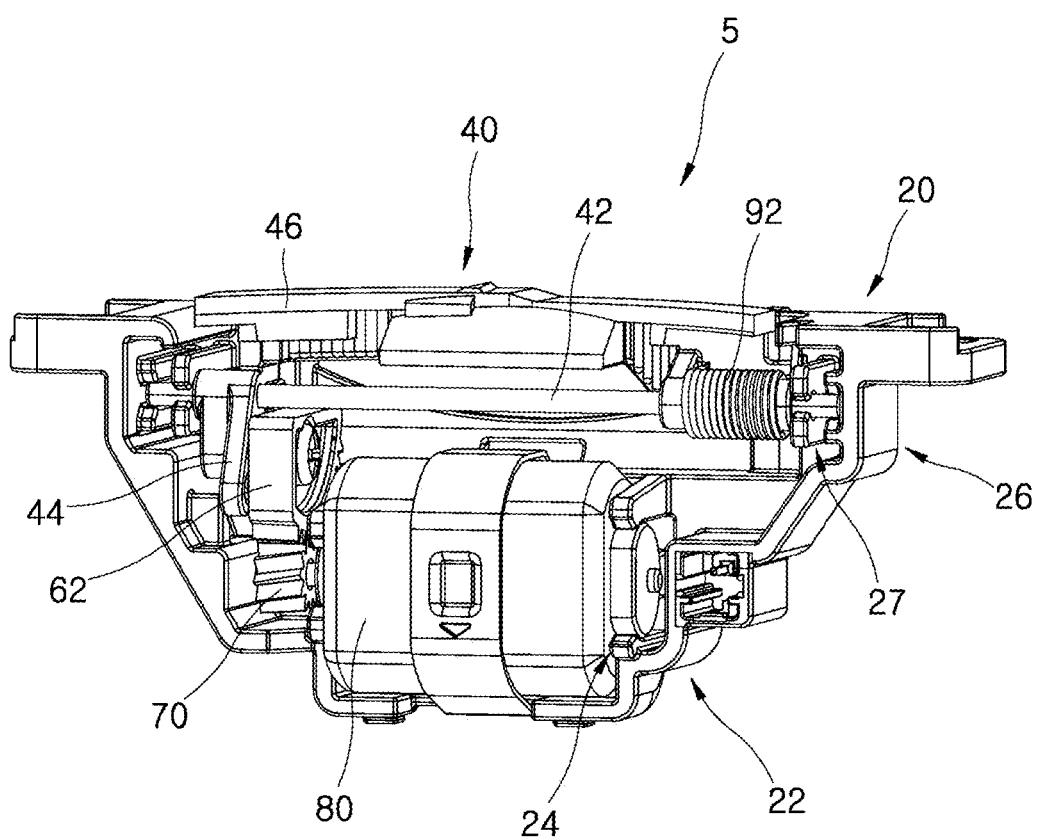
FIG. 7 is a schematic perspective view illustrating the structure of a light distribution switching device of a head lamp in accordance with another embodiment of the present invention.
Figure 8:
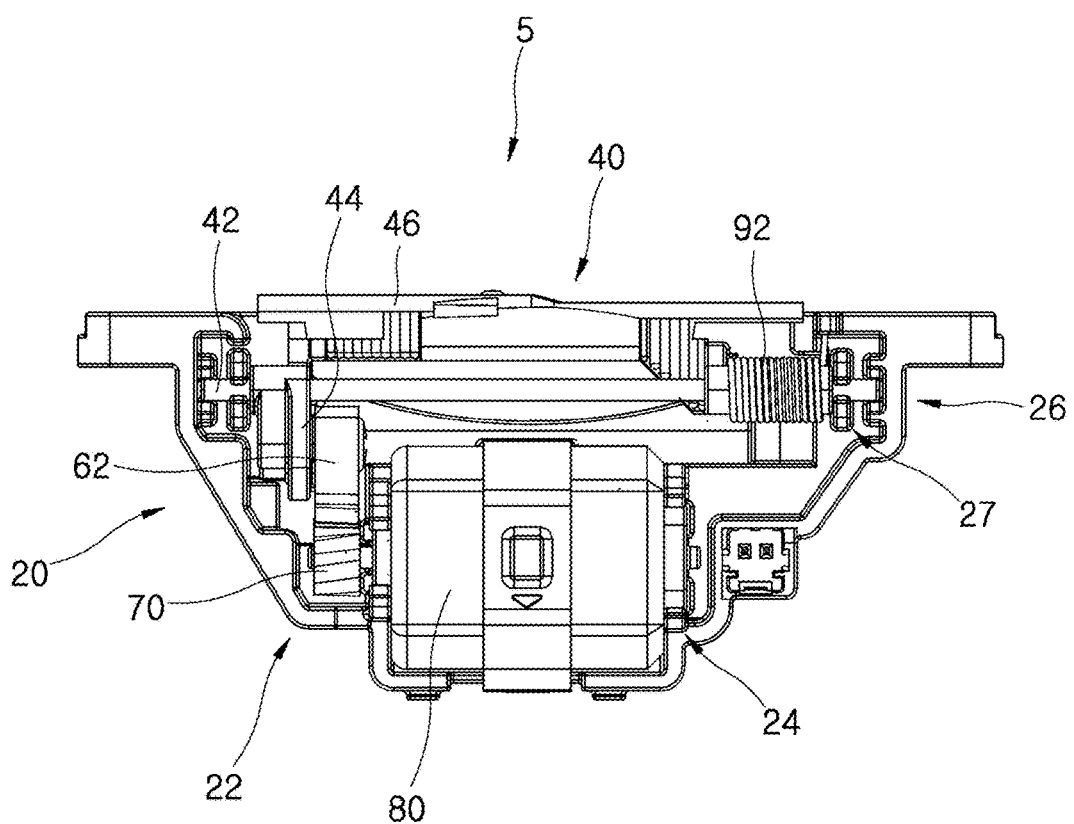
FIG. 8 is a front view of the light distribution switching device of the head lamp in accordance with the embodiment of the present invention.
Figure 9:
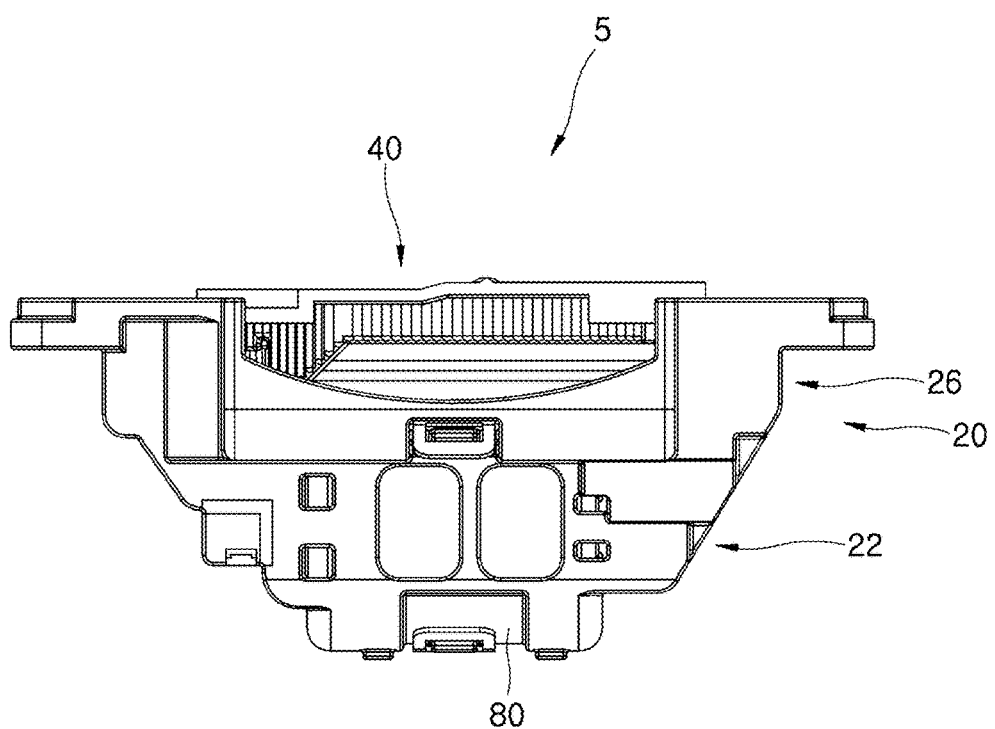
FIG. 9 is a rear view of the light distribution switching device of the head lamp in accordance with the embodiment of the present invention.
Figure 10:
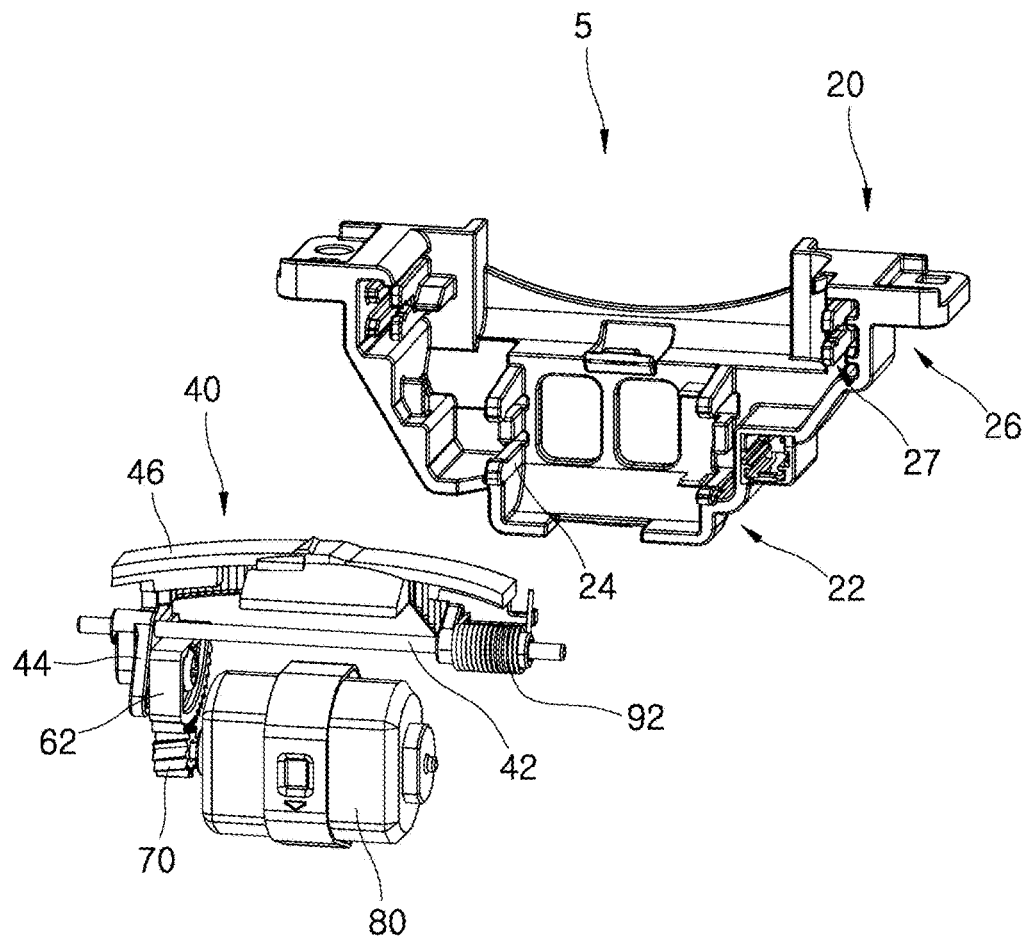
FIG. 10 is a perspective view of the light distribution switching device of the head lamp in accordance with the embodiment of the present invention.
Figure 11:
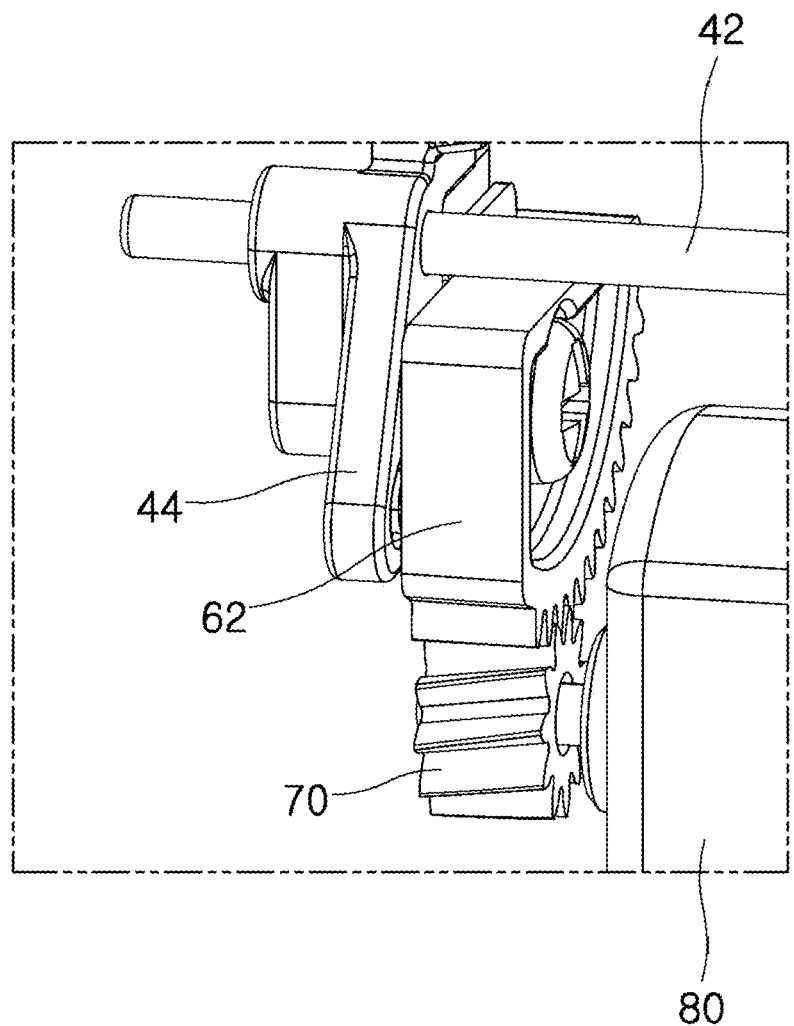
FIG. 11 is a perspective view illustrating that a rotating gear in accordance with the embodiment of the present invention is installed.
Figure 12:
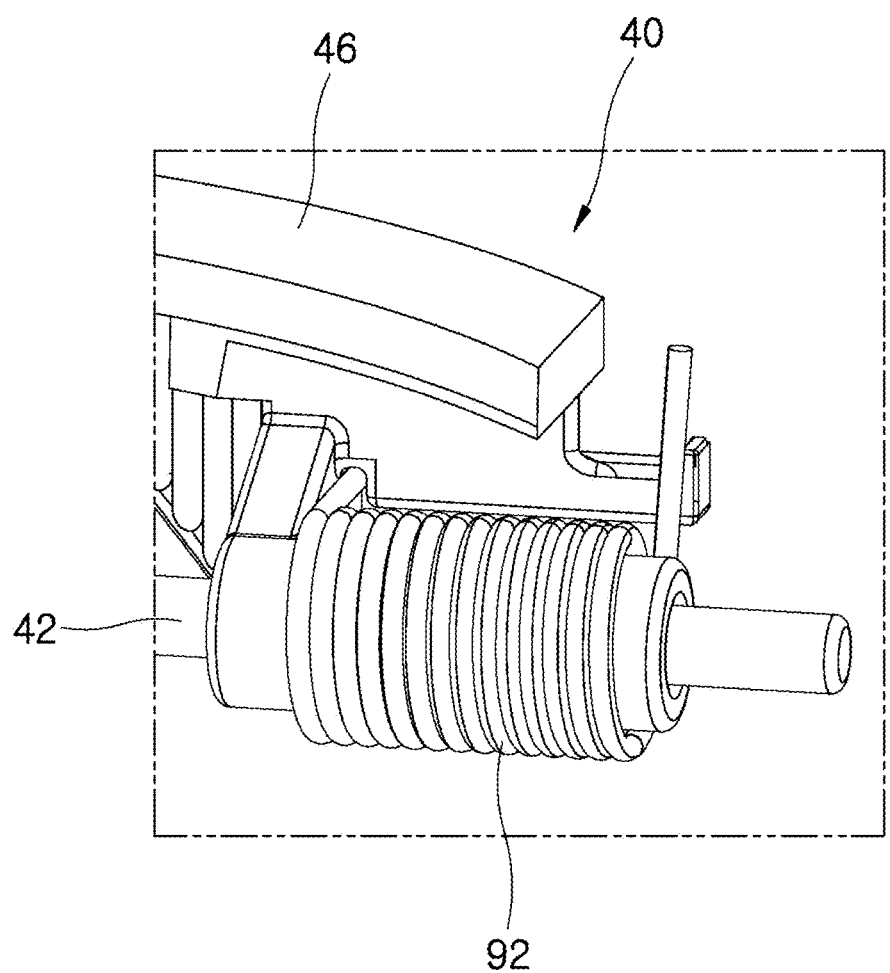
FIG. 12 is a perspective view illustrating that an elastic return part in accordance with the embodiment of the present invention is installed.

FIG. 7 is a schematic perspective view illustrating the structure of a light distribution switching device of a head lamp in accordance with another embodiment of the present invention, FIG. 8 is a front view of the light distribution switching device of the head lamp in accordance with the embodiment of the present invention, FIG. 9 is a rear view of the light distribution switching device of the head lamp in accordance with the embodiment of the present invention, FIG. 10 is a perspective view of the light distribution switching device of the head lamp in accordance with the embodiment of the present invention, FIG. 11 is a perspective view illustrating that a rotating gear in accordance with the embodiment of the present invention is installed, and FIG. 12 is a perspective view illustrating that an elastic return part in accordance with the embodiment of the present invention is installed.

As illustrated in FIGS. 7 to 12, the light distribution switching device 5 of the head lamp in accordance with the embodiment of the present invention may include a housing 20, a shield part 40, a rotating gear 62, a driving gear 70, a driving part 80 and an elastic return part 92.

The housing 20 in accordance with the present embodiment may include a second body part 22 and a second support part 26.

The second body part 22 may have a second mounting groove 24 to which both sides of the driving part 80 are inserted and coupled. Therefore, since the driving part 80 is detachably installed in the second mounting groove 24, it is possible to shorten an operation time required for assembling and maintaining the driving part 80.

The second support part 26 may be extended from the second body part 22, and the shield part 40 may be inserted into the second support part 26 and rotatably supported by the second support part 26. The second support part 26 in accordance with the present embodiment may have a support groove 27 into which a shield shaft member 42 of the shield part 40 is inserted. The support groove 27 having an internal space into which the rod-shaped shield shaft member 42 is inserted may be opened forward toward the shield shaft member 42, while having elasticity.

The shield part 40 in accordance with the present embodiment may include the shield shaft member 42, a shield body 44 and a shield panel 46. Since both sides of the shield shaft member 42 are rotatably inserted into the second support part 26, the installation and maintenance operation of the shield shaft member 42 may be conveniently performed.

The shield body 44 may be extended from the shield shaft member 42 and coupled to the rotating gear 62. The shield body 44 in accordance with the present embodiment may be extended to the bottom of the shield shaft member 42 and face the rotating gear 62. Since the rotating gear 62 is fixed to the shield shaft member 42, the rotating gear 62 may be rotated with the shield part 40.

The shield panel 46 may be extended from the shield shaft member 42, rotated with the shield shaft member 42, and adjust the amount of light irradiated from the light source.

A damper member (not illustrated) in accordance with the present embodiment may be installed on the housing 20 or the shield part 40, and formed of an elastic material. Furthermore, since the damper member is installed on the moving path of the shield part 40, a shock or noise caused by rotation of the damper member may be reduced.

The rotating gear 62 may be fixed to the shield body 44, and a gear engaged with the driving gear 70 may be formed on only the outer circumferential surface of the rotating gear 62 in a preset angle range. The shape of the gear formed on the outer circumferential surface of the rotating gear 62 may be set in consideration of the rotation angle of the shield part 40.

In the present embodiment, a coil spring may be used as the elastic return part 92, and the elastic return part 92 may be installed outside the shield shaft member 42. Since one end of the elastic return part 92 is locked to the shield part 40 and the other end of the elastic return part 92 is locked to the housing 20, the elastic return part 92 may be compressed when the shield part 40 is rotated, and then rotate the shield part 40 to the original position when the outer force is removed.

Hereafter, an assembling process of the light distribution switching device 5 of the head lamp in accordance with another embodiment of the present invention will be described in detail with reference to the accompanying drawings.

The rotating gear 62 and the elastic return part 92 may be installed on the shield part 40 so as to form one module. Then, the shield shaft member 42 may be inserted into the support groove 27 such that the shield part 40 is rotatably installed in the housing 20.

The driving part 80 may be inserted and coupled to the second mounting groove 24, and the driving gear 70 may be engaged with the rotating gear 62. Then, the installation of the driving part 80 may be completed.

In accordance with the present embodiment, since the shield part 30 or 40 on which the elastic return part 90 or 92 and the rotating gear 60 or 62 are mounted is rotatably installed in the single housing 10 or 20, the size of the product can be reduced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A light distribution device of a head lamp, comprising:
   a housing installed in front of a light source of the head lamp;
   a shield part rotatably installed in the housing, and configured to adjust movement of light irradiated from the light source depending on a rotational position;
   a rotating gear mounted on the shield part and configured to rotate together with the shield part;
   a driving part configured to rotate a driving gear engaged with the rotating gear;
   an elastic return part installed on the shield part, and configured to move the shield part to an original position when the driving part is stopped; and
   a holder part forced into a connection hole through the housing, the connection hole being formed at a side surface of the shield part,
   wherein the holder part comprises:
      a head member locked to the outside of the housing;
      an extended body extended from the head member, and forced into the connection hole; and
      a deformable protrusion protruding to the outside of the extending member, and configured to deform by the operation of forcing the extended body into the connection hole.

2. The device of claim 1, wherein the deformable protrusion comprises a plurality of deformable protrusions formed along the outer circumference of the extended body, and having an inclined surface formed at one side thereof.

3. A light distribution device of a head lamp, comprising:
   a housing installed in front of a light source of the head lamp;
   a shield part rotatably installed in the housing, and configured to adjust movement of light irradiated from the light source depending on a rotational position;
   a rotating gear mounted on the shield part and configured to rotate together with the shield part;

a driving part configured to rotate a driving gear engaged with the rotating gear;

an elastic return part installed on the shield part, and configured to move the shield part to an original position when the driving part is stopped; and a holder part forced into a connection hole through the housing, the connection hole being formed at a side surface of the shield part, wherein the housing comprises:

a first body part having a first mounting groove to which both sides of the driving part are inserted and coupled; and a first support part extended from the first body part and rotatably supporting the shield part, wherein the holder part is forced into the connection hole through the first support part.

4. The device of claim 3, further comprising an elastic damper member installed on the first body part located on a moving path of the shield part, and protruding to the outside of the first body part.

5. The device of claim 4, wherein the shield part comprises:

a shield body having the connection hole formed at one side facing the first support part; and a rotation support protrusion protruding to the other side of the shield body, and inserted into the first support part.

6. The device of claim 5, wherein the shield part further comprises a shield panel integrated with the shield body so as to rotate with the shield body, and configured to adjust an irradiation region of light irradiated from the light source.

* * * * *